(12) United States Patent
Schädeli et al.

(10) Patent No.: US 6,867,301 B2
(45) Date of Patent: Mar. 15, 2005

(54) OXIDATION PROCESS FOR HIGHLY DISPERSIBLE QUINACRIDONE PIGMENTS

(75) Inventors: Ulrich Schädeli, Plasselb (CH); Edward Ephraim Jaffe, Wilmington, DE (US); Linda SnyderAllen, Wilmington, DE (US)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 58 days.

(21) Appl. No.: 10/744,366

(22) Filed: Dec. 23, 2003

(65) Prior Publication Data

US 2004/0138458 A1 Jul. 15, 2004

Related U.S. Application Data

(60) Provisional application No. 60/439,898, filed on Jan. 14, 2003, and provisional application No. 60/506,486, filed on Sep. 26, 2003.

(51) Int. Cl.$^7$ .................. C07D 471/02; C07D 471/00
(52) U.S. Cl. ................ 546/49; 546/56; 546/47
(58) Field of Search ................ 546/49, 56, 47

(56) References Cited

U.S. PATENT DOCUMENTS

| 5,840,901 A | 11/1998 | Bäbler | 546/49 |
| 5,856,488 A | 1/1999 | Bäbler | 546/49 |
| 6,013,127 A | 1/2000 | Bäbler | 106/497 |

Primary Examiner—Charanjit S. Aulakh
(74) Attorney, Agent, or Firm—Tyler A. Stevenson

(57) ABSTRACT

A process for the preparation of a quinacridone comprises oxidation of a 6,13-dihydroquinacridone using hydrogen peroxide, wherein a polymeric dispersant is present in the oxidation reaction mixture. The resulting pigment products exhibit greatly improved dispersibility relative to pigments in which the polymeric dispersant is not present during the oxidation reaction.

27 Claims, 3 Drawing Sheets

OXIDATION PROCESS FOR HIGHLY DISPERSIBLE QUINACRIDONE PIGMENTS

This application claims priority of provisional application 60/439,898 filed Jan. 14, 2003 as well as of provisional application 60/506,486 filed Sep. 26, 2003.

SUMMARY

The present invention relates to a process for the preparation of quinacridone pigments by oxidation of the corresponding 6,13-dihydroquinacridone using hydrogen peroxide as oxidant wherein a polymeric dispersant is present in the oxidation reaction medium.

BACKGROUND

Quinacridone pigments are known for their attractive red and magenta colors and for their outstanding fastness properties. The method of preparing quinacridone pigments by oxidizing the correspondingly substituted 6,13-dihydroquinacridone is well known in the art.

For example, numerous publications disclose the oxidation of a 6,13-dihydroquinacridone to the corresponding quinacridone using aromatic nitro compounds as the oxidizing agent in an alcoholic medium containing a base and a small amount of water. However, such processes have the disadvantage of producing considerable organic waste due to the generation of reduced aromatic by-products.

It is also known to oxidize a 6,13-dihydroquinacridone to the corresponding quinacridone by a process wherein the 6,13-dihydroquinacridone is oxidized in a solvent and/or aqueous basic system with an oxygen-containing gas. Such processes are often referred to as "air oxidation" because air is conveniently used as the oxygen-containing gas. Air oxidation processes have the disadvantage that large gas volumes have to be introduced into a heterogeneous reaction mixture, whereby foam is generated. Additionally, it is difficult to visually determine when the reaction is complete.

Furthermore, it is known to oxidize 6,13-dihydroquinacridones dissolved in polar solvents, for example DMSO, using air as the oxidizing agent. Such processes have the advantage of generating excellent quinacridone pigments in a high yield. However, they have the disadvantage of producing a substantial amount of organic waste, such as dimethylsulfone, as by-product during the oxidation reaction, which requires costly solvent regeneration systems.

The use of hydrogen peroxide as oxidant is known and described as advantageous in that it has high oxidation efficiency at ambient pressure, is readily available and does not generate a reduced organic by-product. Specific teachings are found in U.S. Pat. Nos. 5,840,901, 5,856,488 and 6,013,127, all of which are incorporated herein by reference.

DETAILED DESCRIPTION

Figure 1:
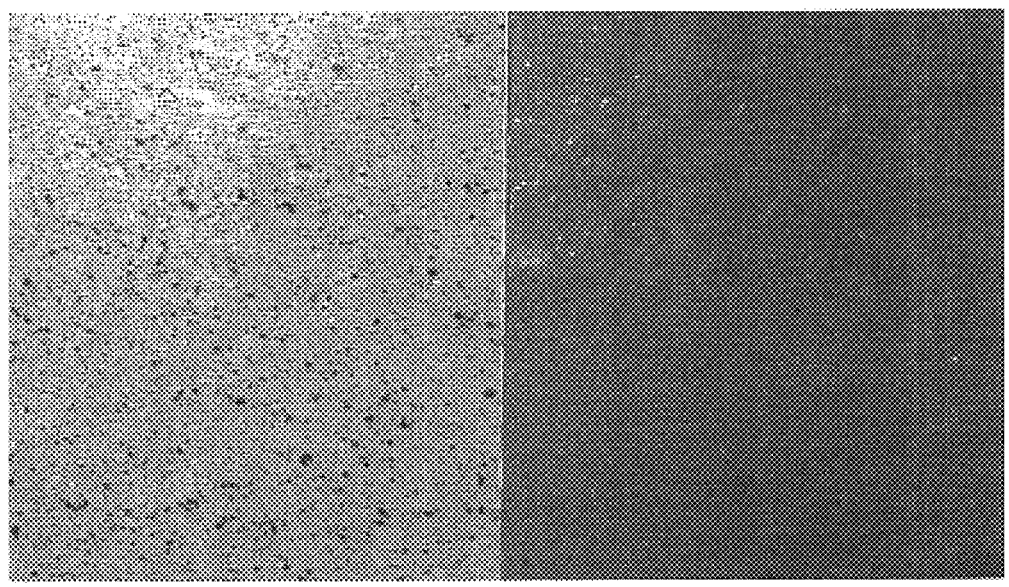
FIG. 1 is a side-by-side masstone comparison for the products from Example 1 (left) and Example 1A.

The present invention relates to a process for preparing a quinacridone of formula I

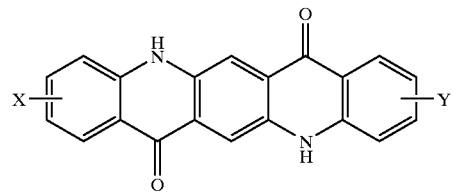

wherein X and Y are independently 1 or 2 substituents selected from the group consisting of H, F, Cl, $C_1$–$C_3$alkyl and $C_1$–$C_3$alkoxy, by the oxidation of a salt of the corresponding 6,13-dihydroquinacridone of formula II

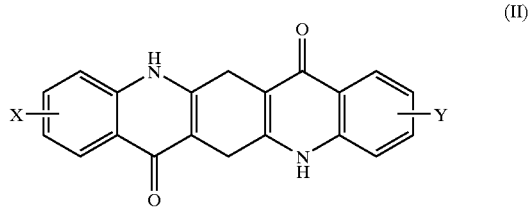

where X and Y are as defined above, which comprises an oxidation step wherein the 6,13-dihydroquinacridone salt is oxidized with hydrogen peroxide in the presence of a polymeric dispersant.

It has been found that the addition of a polymeric dispersant to the reaction medium produces a pigment product having greater color strength, particularly in high molecular weight organic material (plastics or polymeric materials). Most dry pigments are highly aggregated and intensive shearing force is needed to disperse the pigment and to achieve desired color strength. The use of a polymeric dispersant in the oxidation reaction medium produces unexpectedly superior results. Preferably, the polymeric dispersant is added before the oxidation reaction commences. The polymeric dispersant can be added after the oxidation reaction is complete, but the improvements are not as great.

The preferred polymeric dispersant is an aqueous base soluble or aqueous base dispersible resin derived partially or completely from acrylic acid. The aqueous base dispersible resin derived from copolymerization of ethylene and acrylic acid referred to herein is one of the preferred resins for the significant improvement of pigment dispersibility.

Specific examples of preferred aqueous base soluble or aqueous base dispersible resins derived from acrylic acid and other copolymerized acids include acrylic acid alkylene copolymers, methacrylic acid copolymers, acrylic acid-maleic acid copolymers, acrylic acid-methacrylic acid copolymers, acrylic acid-methacrylic acid-ethyl acrylate copolymers, acrylic acid-methacrylic acid-acrylonitrile copolymers, acrylic acid-n-butyl methacrylate copolymers, acrylic acid-methyl methacrylate copolymers, alkyl acrylate-acrylic acid copolymers, alkyl acrylate-acrylic acid-alkylacrylamide copolymers, alkyl acrylate-acrylic acid-itaconic acid copolymers, alkyl acrylate-acrylic acid-alkyl itaconate copolymers, alkyl acrylate-acrylic acid-3-butene-2,3-tricarboxylic acid copolymers, alkyl acrylate-hydroxyalkyl acrylate copolymers, alkyl acrylate-itaconic acid copolymers, alkyl acrylate-ethylene glycol dimethacrylate copolymers, alkyl acrylate-methacrylic acid copolymers, alkyl acrylate-methacrylic acid-diallyl phthalate copolymers, and salts of these polymers (for example, lithium, sodium, potassium, calcium, magnesium, aluminum, and other metal salts). One or more resins selected from the above resins may be used. These resins may be produced by methods commonly used in the art. These resins are not limited to the form of the copolymer, and may be, for example, a block copolymer, a graft copolymer, a random copolymer, or a mixture of these copolymers. A particularly preferred polymeric dispersant is a copolymer of ethylene and acrylic acid, which is commercially available as noted in the examples.

The amount of polymeric dispersant present during the oxidation, and which will remain in the final product, advantageously ranges from 10% to 60% of the total solid isolated product.

Generally, the salt of the 6,13-dihydroquinacridone of formula II is a mono and/or di-alkali metal salt. Di-alkali metal salts are preferred. Most preferred are the 6,13-dihydroquinacridone disodium and/or dipotassium salts.

The 6,13-dihydroquinacridone salt is prepared, for example, by stirring the 6,13-dihydroquinacridone in a basic medium, for example a basic mixture of water and a lower alcohol, at a temperature above 30° C., preferably 40 to 120° C., and most preferably between 50° C. and the corresponding reflux temperature, for 5 minutes to 2.5 hours, preferably 20 minutes to 1.5 hours.

Generally, the oxidation is carried out in a reaction medium obtained by combining a slurry comprising the 6,13-dihydroquinacridone salt, a catalyst, a base, a polymeric dispersant and a suitable liquid phase, with an aqueous solution of hydrogen peroxide.

In general, a suitable liquid phase is any liquid media which promotes the oxidation reaction, and which does not react to a significant extent with the hydrogen peroxide oxidizing agent.

Commonly, the liquid phase is a mixture of a lower alcohol and water which contains 20 to 750 parts, preferably 40 to 600 parts of water, and 50 to 750 parts, preferably 100 to 600 parts, of alcohol per 100 parts 6,13-dihydroquinacridone; parts being parts by weight.

The alcohol is advantageously a lower alcohol, for example, a $C_1$–$C_3$alkanol, preferably methanol. The reaction medium is preferably substantially free of other organic solvents.

However, other organic solvents are tolerated in the reaction medium as long as they do not impair generation of the 6,13-dihydroquinacridone salt or the oxidation reaction.

Any base capable of forming the salt of the 6,13-dihydroquinacridone is useful in the reaction medium. Preferably, the base is an alkali metal hydroxide, most preferably sodium or potassium hydroxide. In certain instances, it is advantageous to use a mixture of sodium hydroxide and potassium hydroxide.

The molar ratio of the base to 6,13-dihydroquinacridone is typically from 2 to 10 moles of base per mole of the 6,13-dihydroquinacridone. Preferably, the reaction medium contains 2.2 to 9 moles of base per mole of the 6,13-dihydroquinacridone.

The generation of the 6,13-dihydroquinacridone salt is observable under a light microscope by the formation of crystals of the 6,13-dihydroquinacridone salt. Depending on the reaction conditions, the base employed and/or the substituents on the 6,13-dihydroquinacridone, the salt is generally in the form of needles, prisms, cubes or platelets. Advantageously the reaction medium is stirred to permit the formation of the dihydroquinacridone salt before oxidation with hydrogen peroxide is begun.

The polymeric dispersant is added as an emulsion or dispersion in amounts between 1–50% by weight, preferably 10 to 50%, most preferably 30 to 50%, relative to the 6,13-dihydroquinacridone.

For a variety of reasons and to avoid potential side reactions as well as for a more controllable process, the oxidation reaction is preferably carried out under an inert gas flow, for example a nitrogen flow.

In a preferred process embodiment, the oxidation is carried out by adding an aqueous solution of hydrogen peroxide over a time interval of 0.5 to 9 hours, preferably 1 to 8 hours, to an alcoholic, aqueous basic stirred slurry of 6,13-dihydroquinacridone and a polymeric dispersant maintained at a temperature of above 60° C., preferably above 70° C. and most preferably at reflux temperature. After completion of the addition of hydrogen peroxide, the stirred reaction mass is further heated at a temperature of above 60° C., preferably above 70° C. and most preferably at reflux temperature for a time interval of 0 to 12 hours, preferably 0.1 to 6 hours, to complete the oxidation and to promote pigment crystallization.

Subsequently, the reaction mixture is cooled to room temperature and neutralized with an inorganic acid, preferably hydrochloric acid, in order to break the basic dispersion, flocculate the pigment and free the polymeric dispersant. The pigment/polymer product is then isolated by filtration, washed with hot water, dried and powdered.

The aqueous solution of hydrogen peroxide generally contains from 1 to 50 weight-percent, preferably 5 to 30 weight-percent, and most preferably 10 to 25 weight-percent, of hydrogen peroxide.

In general, a small excess of the hydrogen peroxide is used. The molar ratio of hydrogen peroxide to 6,13-dihydroquinacridone is, for example, 1.1 to 5 moles, preferably 1.2 to 3.5 moles, of hydrogen peroxide per mole of the 6,13-dihydroquinacridone.

The oxidation of the 6,13-dihydroquinacridone salt to the corresponding quinacridone by hydrogen peroxide is visually followed by the color change of the reaction mixture.

The presence of an oxidation-promoting amount of a catalyst during the oxidation step leads to a higher yield of quinacridone. Additionally, the presence of the catalyst under the oxidation conditions described above, results in a quinacridone product that is substantially free of quinacridonequinone, for example containing less than 2.5 percent by weight of quinacridonequinone. However, a minor amount of quinacridonequinone is tolerated in the product as long as its presence does not substantially reduce the saturation of the final quinacridone pigment.

Any compound capable of catalyzing the oxidation of 6,13-dihydroquinacridone under the present reaction conditions can be utilized as the catalyst. Particularly suitable catalysts used in the inventive process are, for example, the quinone compounds used for the air oxidation of 6,13-dihydroquinacridone to quinacridone. Such quinone catalysts are well known in the art and are utilized in the manufacture of hydrogen peroxide. In particular, suitable catalysts include anthraquinone compounds, especially anthraquinone, and anthraquinone sulfonic acid derivatives, such as anthraquinone-2,7-disulfonic acid or preferably anthraquinone-2-sulfonic acid, or salts thereof, in particular the sodium or potassium salts, especially anthraquinone-2-sulfonic acid, sodium or potassium salt. The quinone catalyst is present in the reaction medium in an amount effective to catalyze the oxidation reaction, for example from 0.005 to 0.1 times the weight of 6,13-dihydroquinacridone, and preferably 0.01 to 0.05 times the weight of 6,13-dihydroquinacridone.

The catalyst can be added according to this invention simultaneously with the 6,13-dihydroquinacridone into the alcohol/aqueous base medium.

Without limiting this invention to any particular theory, it is believed that the quinone catalyst acts to oxidize the 6,13-dihydroquinacridone salt and is itself reduced to the corresponding leuco compound, from which the quinone is then regenerated by oxidation with hydrogen peroxide.

Depending on the composition of the liquid phase, the recrystallization time and temperature, transparent smaller particle size or opaque larger particle size quinacridone pigments are generated. Lower temperatures and shorter times favor a transparent product, while higher temperatures and longer times favor a more opaque product.

Additionally, it is advantageous to add a particle growth inhibitor before or after the 6,13-dihydroquinacridone salt generation to control the pigment particle size of the oxidized quinacridone pigment. Particle growth inhibitors, including antiflocculating or rheology-improving agents, are well known. Suitable particle growth inhibitors include, for example, phthalimidomethylquinacridones, imidazolylmethylquinacridones, pyrazolylmethylquinacridones, quinacridone sulfonic acids and their salts, for example the aluminum salt, or 1,4-diketo-3,6-diphenylpyrrolo[3,4-c]pyrrole sulfonic acids and their salts.

To achieve an optimum effect, the particle growth inhibitor is added in an amount of 0.05 to 8%, preferably 0.1 to 6% based on 6,13-dihydroquinacridone, prior to oxidation, preferably before the 6,13-dihydroquinacridone salt generation.

The instant process is especially useful for the preparation of quinacridone, 2,9-dichloroquinacridone, 4,11-difluoroquinacridone, 4,11-dichloroquinacridone, 2,9-dimethylquinacridone and 2,9-dimethoxyquinacridone.

Additionally, the process is also suitable for the preparation of solid solutions containing one or more quinacridone components. Thus, another aspect of this invention relates to the process wherein a mixture containing two or more 6,13-dihydroquinacridones of formula II which are co-oxidized by the inventive process to yield a highly dispersible quinacridone solid solution product.

The process of this invention is particularly practical for the preparation of quinacridone/2,9-dichloroquinacridone, quinacridone/4,11-dichloroquinacridone, quinacridone/2,9-dimethylquinacridone, quinacridone/2,9-dimethoxyquinacridone, 2,9-dichloroquinacridone/2,9-dimethylquinacridone, 2,9-dichloroquinacridone/2,9-dimethoxyquinacridone or 2,9-dimethylquinacridone/2,9-dimethoxyquinacridone solid solution pigments.

Since the 6,13-dihydroquinacridone salt generation and the oxidation reaction are advantageously carried out sequentially in the same container, practically no handling losses occur. Thus, the process according to this invention provides a quinacridone product in a high yield.

Additionally, the inventive process selectively oxidizes the 6,13-dihydroquinacridone to the corresponding quinacridone easily. The end product normally contains less than 2.5% of the unreacted 6,13-dihydroquinacridone and less than 2.0% of the over oxidized quinacridonequinone. Typically, at least 96%, usually 97.5% and above, of the dihydroquinacridone is converted to the corresponding quinacridone.

Although the oxidation is carried out in a heterogeneous reaction medium, the inventive process provides quinacridone pigments with a narrow particle size distribution. Thus, due to their high purity and desirable narrow particle size distribution, the obtained quinacridone pigments manifest outstanding pigment properties, such as, for example, high chroma, in addition to excellent dispersibility.

The process of this invention is particularly suitable for the preparation of highly dispersible specific crystal modifications of the unsubstituted or substituted quinacridones, for example, the alpha, beta or gamma form of the unsubstituted quinacridone, the various forms of 2,9-dimethylquinacridone and the alpha, beta and/or gamma forms of 2,9-dichloroquinacridone.

In general, the basic, aqueous reaction medium contains an amount of water equal to from about 1 to 20 times, preferably 1.5 to 14 times, the weight of the 6,13-dihydroquinacridone.

In a preferred embodiment of this invention, the alcohol-containing aqueous base reaction medium to which the catalyst and the aqueous dispersion of the polymer have been added, and optionally an antifoam agent, is treated with the oxidizing agent at an elevated temperature to effect the oxidation and to promote the preparation of a desirable, highly dispersible quinacridone crystal modification or quinacridone solid solution.

To avoid the generation of foam during the addition of hydrogen peroxide, the presence of a small amount of an antifoam agent is usually advantageous, as long as the desired crystal phase of the quinacridone pigment is generated. Preferably the antifoam agent is used in an amount of from 0.1 to 6 percent by weight based on the 6,13-dihydroquinacridone, preferably from 0.5 to 4 percent.

Suitable antifoam agents include, for example, $C_5$–$C_{12}$alkyl alcohols such as iso-octanol, alkylenediols such as 1,2-hexanediol or 1,2-dodecanediol; polyalkylene glycol or polyalkylene glycol derivatives such as for example cetyloxypoly(ethyleneoxy)ethanol with an average molecular weight of around 620; alkylphenoxypoly (ethyleneoxy)ethanol; or quaternary ammonium compounds such as benzyltributyl ammonium chloride. Many such suitable antifoam agents are available commercially.

The instant process is especially useful for the preparation of highly dispersible quinacridone, 2,9-dichloroquinacridone, 4,11-difluoroquinacridone, 4,11-dichloroquinacridone, 2,9-dimethylquinacridone and 2,9-dimethoxyquinacridone without resorting to multiple post-oxidation steps.

The following applies to the product resulting from the oxidation process described above. Depending on the end use, it may be advantageous to add rheology-improving agents before the isolation of the pigment. Suitable rheology-improving agents are for example the above-mentioned particle growth inhibitors or antiflocculating agents, which are added preferably in amounts of 2 to 10% by weight, most preferably of 2 to 8% by weight, based on the weight of 6,13-dihydroquinacridone.

The present quinacridone and quinacridone solid solution pigments are suitable as coloring matter for inorganic or organic substrates. They are highly suitable for coloring high molecular weight materials, which can be processed to cast and molded articles or which are used in ink and coating compositions such as solvent or water based coatings, for example in automotive coatings, depending on the nature of the polymeric dispersant utilized.

Suitable high molecular weight organic materials include thermoplastics, thermoset plastics or elastomers, for example, cellulose ethers; cellulose esters such as ethyl cellulose; linear or crosslinked polyurethanes; linear, crosslinked or unsaturated polyesters; polycarbonates; polyolefins such as polyethylene, polypropylene, polybutylene or poly-4-methylpent-1-ene; polystyrene; polysulfones; polyamides; polycycloamides; polyimides; polyethers; polyether ketones such as polyphenylene oxides; and also poly-p-xylene; polyvinyl halides such as polyvinyl chloride, polyvinylidene chloride, polyvinylidene fluoride or polytetrafluoroethylene; acrylic polymers such as polyacrylates, polymethacrylates or polyacrylonitrile; rubber; silicone polymers; phenol/formaldehyde resins; melamine/formaldehyde resins; urea/formaldehyde resins; epoxy resins; styrene butadiene rubber; acrylonitrile-butadiene rubber or chloroprene rubber; singly or in mixtures.

Generally, the pigments are used in an effective pigmenting amount, for example, of 0.01 to 30% by weight, preferably 0.1 to 10% by weight, based on the weight of the high molecular weight organic material to be pigmented. Thus, the present invention also relates to a pigmented plastic composition which comprises a plastic material and an effective pigmenting amount of a pigment or pigment solid solution prepared according to a process of the present invention, and to a process for preparing said pigmented plastic compositions.

The present pigments are easily dispersible and can be readily incorporated into organic matrixes to provide homogenous colorations possessing high saturation and excellent light and weather fastness properties.

The high molecular weight organic materials are pigmented with the pigments of the present invention by mixing the pigments, if desired in the form of a masterbatch, into substrates using high shear techniques including roll mills or mixing or grinding apparatus. The pigmented material is then brought into the desired final form by known methods, such as calendaring, pressing, extruding, brushing, casting or injection molding.

The following examples describe certain embodiments of this invention, but the invention is not limited thereto. It should be understood that numerous changes to the disclosed embodiments can be made in accordance with the disclosure herein without departing from the spirit or scope of the invention. These examples are therefore not meant to limit the scope of the invention. Rather, the scope of the invention is to be determined only by the appended claims and their equivalents. In these examples all parts given are by weight unless otherwise indicated.

The X-ray diffraction patterns for identification and purity assessment of various forms as well as solid solutions of quinacridones were determined on a Rigaku Geigerflex Diffractometer type D/MaxII v bx. Any surface area measurements were carried out by the BET method.

EXAMPLE 1

In a 4-neck, 1 l round-bottom flask equipped with reflux condenser, mechanical paddle-blade stirrer and a thermocouple element, 8.4 g dihydroquinacridone and 36.6 g 2,9-dichlorodihydroquinacridone are dispersed in 280 ml methanol. Then 136.8 g of a 45% aqueous solution of potassium hydroxide are added followed by 1.8 g phthalimidomethylquinacridone. The resulting dispersion is then heated to reflux and stirred for 1 hour. Afterwards, 0.5 g anthraquinone-2-sulfonic acid, sodium salt are added. To the resulting refluxing dispersion, 67.5 g of a 16.85% aqueous solution of hydrogen peroxide are added dropwise at a rate of 0.3 ml/min, using a peristaltic pump.

After completion of hydrogen peroxide addition, the slurry is stirred for an additional 10 minutes. Finally the pigment is isolated by filtration, washed with water to a neutral pH, and dried at 80° C. for 15 hours, yielding 39.7 g of a magenta powder. This powder is homogenized in an Osterizer® mixer.

EXAMPLE 1A

In a 4-neck 1 l round-bottom flask equipped with reflux condenser, mechanical paddle-blade stirrer and a thermocouple element, 8.4 g dihydroquinacridone and 36.6 g 2,9-dichlorodihydroquinacridone are dispersed in 280 ml methanol. Then 136.8 g of a 45% aqueous solution of potassium hydroxide are added followed by 1.8 g phthalimidomethylquinacridone. The resulting dispersion is then heated to reflux and stirred for 1 hour. Afterwards, 0.5 g anthraquinone-2-sulfonic acid, sodium salt are added, followed by 80 g of Michem Emulsion 02125 (co-polymer of ethylene and acrylic acid, 24.5% solids, Michelman Inc., Cincinnati, Ohio). To the resulting refluxing dispersion, 67.5 g of a 16.85% aqueous solution of hydrogen peroxide are added dropwise at a rate of 0.3 ml/min, using a peristaltic pump.

After completion of hydrogen peroxide addition, the slurry is stirred for an additional 10 minutes, cooled to room temperature and neutralized to pH 7 by dropwise addition of 37% aqueous hydrochloric acid. Finally the dispersion is filtered and washed with water, yielding after drying at 80° C. for 15 hours 63.6 g of a magenta powder. This powder is homogenized in an Osterizer® mixer.

The materials from Examples 1 and 1A were formulated in 2/98 tint at 2.0% (equal weight) and 0.50% masstone (equal weight) in a standard laboratory flexible vinyl compound and incoporated via two roll (oil heated 6" unit with a 1:1 roll speed ratio) for 7 minutes at 315° F. (157° C.) under normal milling conditions—low shear.

Colorimetric measurements (X-Rite SP-68 spectrophotometer) were made to determine shade and strength. The coloristic data are noted in Table 1.

TABLE 1

| Normal Milling | | | $\Delta L^*$ | $\Delta a^*$ | $\Delta b^*$ | $\Delta C^*$ | $\Delta H^*$ | $\Delta E^*$ | Strength |
|---|---|---|---|---|---|---|---|---|---|
| Ex 1 | Tint | Control | | | | | | | 100% |
| Ex 1A | | | −16.16 | 26.15 | −10.25 | 27.93 | 2.94 | 32.40 | 919% |
| Ex 1 | Masstone | Control | — | — | — | — | — | — | — |
| Ex 1A | | | −11.32 | 9.81 | 15.26 | 10.11 | 15.07 | 21.39 | |

The results illustrate that the Example 1A sample, containing the polymer, shows greatly improved dispersibility and strength development. Based on pigment content (Example 1 taken as 100%, Example 1A as 69.2%), the Example 1A sample shows 1328% greater strength relative to the example 1 sample. Improved dispersibility and strength are clearly demonstrated in the masstone photos (FIG. 1).

EXAMPLE 2

In a 4-neck 1 l round-bottom flask equipped with reflux condenser, mechanical paddle-blade stirrer and a thermocouple element, 26.2 g dihydroquinacridone and 19.0 g 4,11-dichlorodihydroquinacridone are dispersed in 280 ml methanol. Then 38.0 g of a 50% aqueous solution of sodium hydroxide are added. The resulting dispersion is stirred for 5 minutes, then 0.5 g anthraquinone-2-sulfonic acid, sodium salt and 2.4 g phthalimidomethylquinacridone are added. The dispersion is stirred for 5 minutes. Before heating to reflux, 40 ml water are added. To the resulting refluxing dispersion, 84.4 g of a 17.17% aqueous solution of hydrogen peroxide are added dropwise at a rate of 0.36 ml/min, using a peristaltic pump.

After completion of the hydrogen peroxide addition, the slurry is stirred for an additional 10 minutes. Finally the pigment is isolated by filtration, washed with water to a neutral pH, and dried at 80° C. for 15 hours, yielding 44.1 g of a scarlet powder. This powder is homogenized in an Osterizer® mixer.

EXAMPLE 2A

In a 4-neck 1 l round-bottom flask equipped with reflux condenser, mechanical paddle-blade stirrer and a thermocouple element, 26.2 g dihydroquinacridone and 19.0 g 4,11-dichlorodihydroquinacridone are dispersed in 280 ml methanol. Then 38.0 g of a 50% aqueous solution of sodium hydroxide are added. The resulting dispersion is stirred for 5 minutes, then 0.5 g anthraquinone-2-sulfonic acid, sodium salt and 2.4 g phthalimidomethylquinacridone are added. The dispersion is stirred for 5 minutes. Before heating to reflux, 40 ml water are added. At reflux, 80 g of Michem Emulsion 02125 (co-polymer of ethylene and acrylic acid, 24.5% solids, Michelman Inc., Cincinnati, Ohio) is added. To the resulting refluxing dispersion, 84.4 g of a 17.17% aqueous solution of hydrogen peroxide are added dropwise at a rate of 0.36 ml/min, using a peristaltic pump.

After completion of hydrogen peroxide addition, the slurry is stirred for an additional 10 minutes, cooled to room temperature and neutralized to pH 7 by dropwise addition of 37% aqueous hydrochloric acid. Finally the dispersion is filtered and washed with water, yielding after drying at 80° C. for 15 hours, 65.2 g of a scarlet powder. This powder is homogenized in an Osterizer® mixer.

The materials from Examples 2 and 2A were formulated in 2/98 tint at 2.0% (equal weight) and 0.50% masstone (equal weight) in a standard laboratory flexible vinyl compound and incoporated via two roll milling (oil heated 6" unit with a 1:1 roll speed ratio) for 7 minutes at 315° F. (157° C.) under normal milling conditions—low shear.

Colorimetric measurements (X-Rite SP-68 spectrophotometer) were made to determine shade and strength. The coloristic data are noted in Table 2.

EXAMPLE 3

In a 4-neck 1 l round-bottom flask equipped with reflux condenser, mechanical paddle-blade stirrer and a thermocouple element, 22.5 g dihydroquinacridone and 22.5 g 2,9-dichlorodihydroquinacridone are dispersed in 230 ml methanol. Then 53.5 g of a 50% aqueous solution of sodium hydroxide are added, leading to a rise in viscosity. The resulting viscous dispersion is then heated at 50–55° C. for 1 hour. Before the dispersion is heated to reflux, 1.2 g phthalimidomethylquinacridone are added. At reflux, 0.5 g anthraquinone-2-sulfonic acid, sodium salt are added. To the resulting refluxing dispersion, 77.3 g of a 16.9% aqueous solution of hydrogen peroxide are added dropwise at a rate of 0.3 ml/min, using a peristaltic pump.

After completion of hydrogen peroxide addition, the slurry is stirred for an additional 10 minutes. Finally the pigment is isolated by filtration, washed with water to a neutral pH, and dried at 80° C. for 15 hours, yielding a fine powdery magenta pigment. This powder is homogenized in an Osterizer® mixer.

EXAMPLE 3A

In a 4-neck 1 l round-bottom flask equipped with reflux condenser, mechanical paddle-blade stirrer and a thermocouple element, 22.5 g dihydroquinacridone and 22.5 g 2,9-dichlorodihydroquinacridone are dispersed in 230 ml methanol. Then 53.5 g of a 50% aqueous solution of sodium hydroxide are added, leading to a rise in viscosity. The resulting viscous dispersion is then heated at 50–55° C. for 1 hour. Before the dispersion is heated to reflux, 1.2 g phthalimidomethylquinacridone are added. At reflux, 0.5 g anthraquinone-2-sulfonic acid, sodium salt are added, followed by 80 g of Michem Emulsion 02125 (co-polymer of ethylene and acrylic acid, 24.5% solids, Michelman Inc., Cincinnati, Ohio). To the resulting refluxing dispersion, 77.3 g of a 16.9% aqueous solution of hydrogen peroxide are added dropwise at a rate of 0.3 ml/min, using a peristaltic pump.

After completion of hydrogen peroxide addition, the slurry is stirred for an additional 10 minutes, cooled to room temperature and neutralized to pH 7 by dropwise addition of 37% aqueous hydrochloric acid. Finally the dispersion is filtered and washed with water, yielding, after drying at 80° C. for 15 hours, a magenta powder. This powder is homogenized in an Osterizer® mixer.

The materials from Examples 3 and 3A were formulated in 2/98 tint at 2.0% (equal weight) and 0.50% masstone

TABLE 2

| Normal Milling | | | $\Delta L^*$ | $\Delta a^*$ | $\Delta b^*$ | $\Delta C^*$ | $\Delta H^*$ | $\Delta E^*$ | Strength |
|---|---|---|---|---|---|---|---|---|---|
| Ex 2 | Tint | Control | | | | | | | 100% |
| Ex 2A | | | −4.80 | 12.67 | 2.38 | 12.77 | 1.80 | 13.76 | 261% |
| — | | | — | — | — | — | — | — | — |
| Ex 2 | Masstone | Control | | | | | | | |
| Ex 2A | | | −0.84 | 0.55 | 8.38 | 4.38 | 7.16 | 8.44 | |

Figure 2:
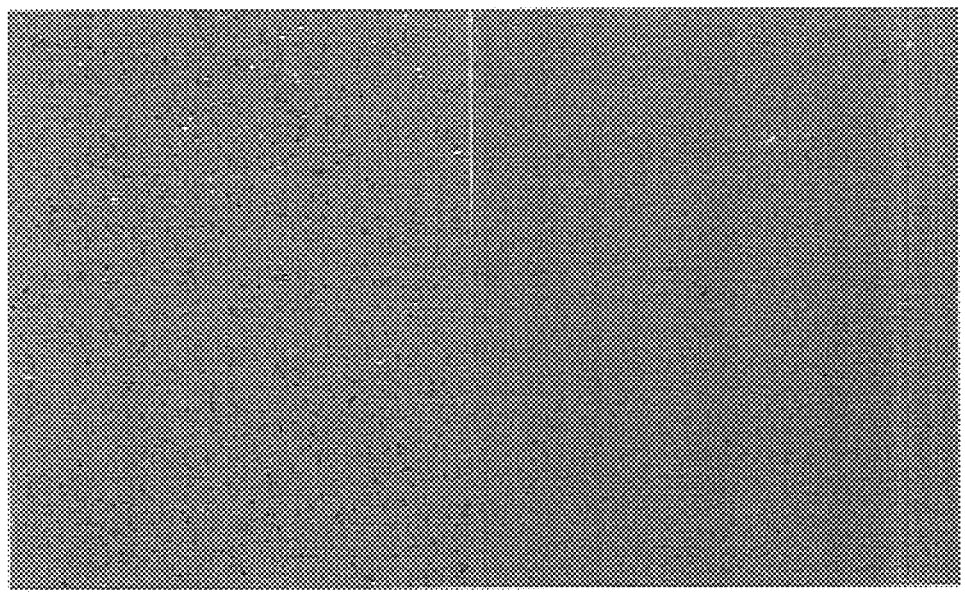
FIG. 2 is a side-by-side masstone comparison for the products from Example 2 (left) and Example 2A.

The results illustrate that the Example 2A sample; containing the polymer, shows much improved dispersibility and strength development. Based on pigment content (Example 2 taken as 100%, Example 2A as 69.9%), the Example 2A sample shows 373% greater strength relative to the Example 2 sample. Improved dispersibility and strength are also demonstrated in the masstone photos (FIG. 2).

(equal weight) in a standard laboratory flexible vinyl compound and incoporated via two roll milling (oil heated 6" unit with a 1:1 roll speed ratio) for 7 minutes at 315° F. (157° C.) under normal milling conditions—low shear.

Colorimetric measurements (X-Rite SP-68 spectrophotometer) were made to determine shade and strength. The coloristic data are noted in Table 3.

TABLE 3

| Normal Milling | | | ΔL* | Δa* | Δb* | ΔC* | ΔH* | ΔE* | Strength |
|---|---|---|---|---|---|---|---|---|---|
| Ex 3 | Tint | Control | | | | | | | 100% |
| Ex 3A | | | −7.09 | 15.10 | −2.65 | 15.15 | 2.34 | 16.89 | 273% |
| Ex 3 | Masstone | Control | | | | | | | — |
| Ex 3A | | | −0.25 | −1.61 | 9.73 | 0.51 | 9.85 | 9.87 | |

Figure 3:
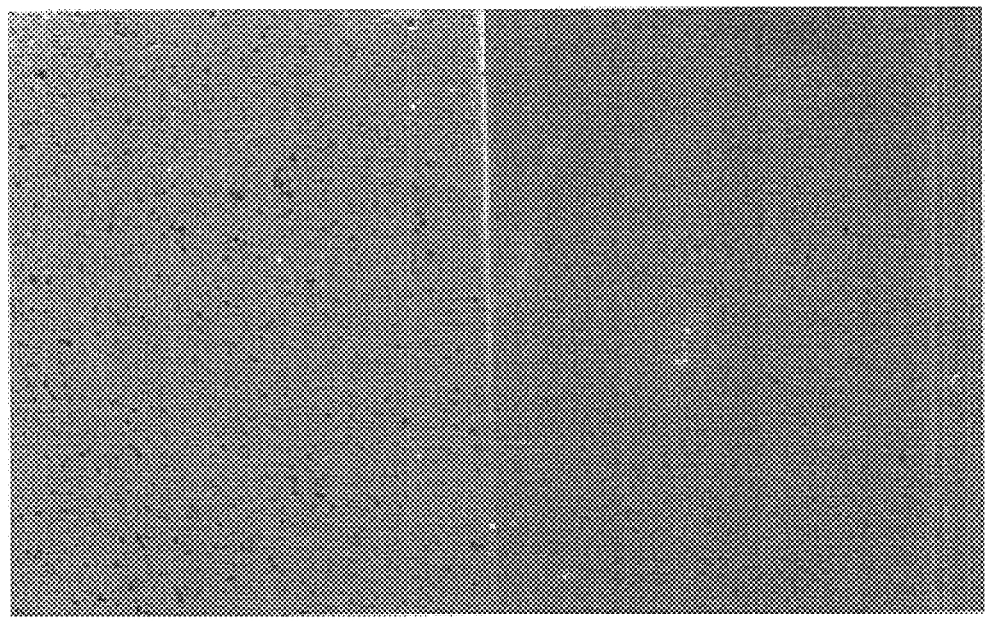
FIG. 3 is a side-by-side masstone comparison for the products from Example 3 (left) and Example 3A.

The results illustrate that the Example 3A sample, containing the polymer, shows much improved dispersibility and strength development. Based on pigment content (Example 3 taken as 100%, Example 3A as 70.1%) the Example 3A sample shows close to 389% greater strength relative to Example 3 sample. Improved dispersibility and strength are also demonstrated in the masstone photos (FIG. 3).

EXAMPLE 4

In a 4-neck 1 l round-bottom flask equipped with reflux condenser, mechanical paddle-blade stirrer and a thermocouple element, 45 g 2,9-dichlorodihydroquinacridone, and 2.3 g phthalimidomethylquinacridone are dispersed in 280 ml methanol. Then 80 g of a 50% aqueous solution of sodium hydroxide are added. The resulting dispersion is stirred at 30–45° C. for 5 minutes. Then the dispersion is heated to reflux and held for 1 hour with stirring. After the 1 hour hold, 0.9 g anthraquinone-2-sulfonic acid, sodium salt are added. To the resulting refluxing dispersion, 65.3 g of a 17.31% aqueous solution of hydrogen peroxide are added dropwise at a rate of 0.3 ml/min, using a peristaltic pump. The dispersion is stirred an additional 10 minutes after the end of peroxide addition, then 100 ml water is added.

Finally the pigment is isolated by filtration, washed with water to a neutral pH, and dried at 80° C. for 15 hours, yielding a fine powdery pigment. This powder is homogenized in an Osterizer® mixer.

EXAMPLE 4A

In a 4-neck 1 l round-bottom flask equipped with reflux condenser, mechanical paddle-blade stirrer and a thermocouple element, 45 g 2,9-dichlorodihydroquinacridone, and 2.3 g phthalimidomethylquinacridone are dispersed in 280 ml methanol. Then 80 g of a 50% aqueous solution of sodium hydroxide are added. The resulting dispersion is then stirred at 30–45° C. for 5 minutes. Then the dispersion is heated to reflux and held for 1 hour. After stirring for 1 hour at reflux, 0.9 g anthraquinone-2-sulfonic acid, sodium salt are added followed by 80 g of Michem Emulsion 02125 (co-polymer of ethylene and acrylic acid, 24.5% solids, Michelman Inc., Cincinnati, Ohio). To the resulting refluxing dispersion, 65.3 g of a 17.31% aqueous solution of hydrogen peroxide are added dropwise at a rate of 0.3 ml/min, using a peristaltic pump. The dispersion is stirred an additional 10 minutes after end of peroxide addition.

After completion of the hydrogen peroxide addition, the slurry is cooled to room temperature and neutralized to pH 7 by dropwise addition of 37% aqueous hydrochloric acid. Finally the pigment is isolated by filtration, washed with water, and dried at 80° C. for 15 hours, yielding a fine powdery pigment. This powder is homogenized in an Osterizer® mixer.

The material from Example 4 and its 4a complement are formulated in 2/98 tint at 2.0% (equal weight) in a standard laboratory flexible vinyl compound and incorporated via two roll milling (oil heated 6" unit with a 1:1 roll speed ratio) for 7 minutes at 315° F. (157° C.) under normal milling conditions—low shear.

Colorimetric measurements (X-Rite SP-68 spectrophotometer) are made to determine shade and strength. The coloristic data are noted in Table 4.

TABLE 4

| Normal Milling | | | ΔL* | Δa* | Δb* | ΔC* | ΔH* | ΔE* | Strength |
|---|---|---|---|---|---|---|---|---|---|
| Ex 4 | Tint | Control | | | | | | | 100% |
| Ex 4A | | | −14.94 | 20.24 | −8.29 | 21.77 | 2.09 | 26.49 | 775 |

The resin-containing product of example 4a shows close to 1098% greater strength relative to its resin free counterpart at 100%. The results illustrate that the Example 4A sample, containing the polymer, shows greatly improved dispersibility and strength development.

We claim:

1. A process for preparing a quinacridone of formula I

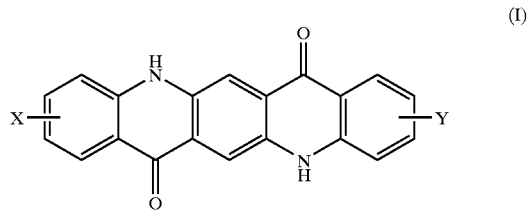

(I)

wherein X and Y are independently 1 or 2 substituents selected from the group consisting of H, F, Cl, $C_1$–$C_3$alkyl and $C_1$–$C_3$alkoxy, from a salt of a corresponding 6,13-dihydroquinacridone of formula II

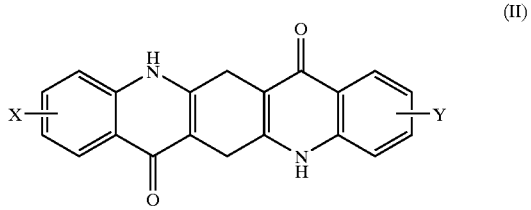

(II)

where X and Y are as defined above, which comprises oxidizing the 6,13-dihydroquinacridone salt in a liquid reaction medium with hydrogen peroxide in the presence of a polymeric dispersant.

2. A process of claim 1, wherein the polymeric dispersant is combined with the dihydroquinacridone salt before addition of the hydrogen peroxide.

3. A process according to claim 1, wherein the polymeric dispersant is a polymer or copolymer of acrylic acid.

4. A process according to claim 1, wherein the polymeric dispersant is a copolymer of acrylic acid selected from the group consisting of acrylic acid alkylene copolymers, methacrylic acid copolymers, acrylic acid-maleic acid copolymers, acrylic acid-methacrylic acid copolymers, acrylic acid-methacrylic acid-ethyl acrylate copolymers, acrylic acid-methacrylic acid-acrylonitrile copolymers, acrylic acid-n-butyl methacrylate copolymers, acrylic acid-methyl methacrylate copolymers, alkyl acrylate-acrylic acid copolymers, alkyl acrylate-acrylic acid-alkylacrylamide copolymers, alkyl acrylate-acrylic acid-itaconic acid copolymers, alkyl acrylate-acrylic acid-alkyl itaconate copolymers, alkyl acrylate-acrylic acid-3-butene-2,3-tricarboxylic acid copolymers, alkyl acrylate-hydroxyalkyl acrylate copolymers, alkyl acrylate-itaconic acid copolymers, alkyl acrylate-ethylene glycol dimethacrylate copolymers, alkyl acrylate-methacrylic acid copolymers, alkyl acrylate-methacrylic acid-diallyl phthalate copolymers, and salts of these polymers.

5. A process according to claim 1, wherein the polymeric dispersant is a copolymer of ethylene and acrylic acid.

6. A process according to claim 1, wherein the amount of polymeric dispersant present during the oxidation and in the final product ranges from 10% to 60% of the total solid isolated product.

7. A process of claim 1, wherein the oxidation step is carried out by combining a slurry comprising the 6,13-dihydroquinacridone salt, a catalyst, a base, the polymeric dispersant and a liquid phase, with an aqueous solution of hydrogen peroxide.

8. A process according to claim 7, wherein the liquid phase comprises from about 20 to 750 parts by weight of water and from about 50 to 750 parts by weight of a lower alcohol per 100 parts by weight of 6,13-dihydroquinacridone.

9. A process of claim 8, wherein the alcohol is a $C_1$ to $C_3$ alcohol.

10. A process of claim 8, wherein the alcohol is methanol.

11. A process of claim 1, wherein the 6,13-dihydroquinacridone salt is a di-sodium or di-potassium salt.

12. A process of claim 7, wherein the base is an alkali metal hydroxide which is present in an amount of from 2 to 10 moles per mole of the 6,13-dihydroquinacridone.

13. A process according to claim 1, further comprising the step of permitting the formation of the dihydroquinacridone salt before oxidation with hydrogen peroxide is begun.

14. A process according to claim 1, wherein an oxidation catalyst is used.

15. A process according to claim 14, wherein the catalyst is selected from the group consisting of anthraquinone, anthraquinone-2-sulfonic acid and anthraquinone disulfonic acid, or a salt thereof.

16. A process of claim 14, wherein the catalyst is anthraquinone-2-sulfonic acid, sodium or potassium salt.

17. A process according to claim 14, wherein the catalyst is present in an amount of from 0.005 to 0.1 times the weight of the 6,13-dihydroquinacridone.

18. A process according to claim 14, wherein the oxidation step is carried out by combining a 1 to 50 percent by weight aqueous solution of hydrogen peroxide with a slurry comprising the 6,13-dihydroquinacridone, the catalyst, the base, the polymeric dispersant and the liquid phase.

19. A process according to claim 1, wherein the aqueous hydrogen peroxide solution has a concentration of 5 to 30 weight percent of hydrogen peroxide.

20. A process according to claim 1, wherein 1.1 to 5 moles of the hydrogen peroxide are used per mole of 6,13-dihydroquinacridone.

21. A process according to claim 18, wherein the aqueous solution of hydrogen peroxide is added to the slurry over a time interval of from 0.5 hours to 9 hours at elevated temperature and the reaction medium is subsequently maintained, with stirring, at an elevated temperature for from 0 to 12 hours to complete the oxidation and promote pigment recrystallization.

22. A process according to claim 21, wherein the reaction medium is maintained at a temperature of from 60° C. to its reflux temperature for from 0.1 to 6 hours to complete the oxidation and promote pigment recrystallization.

23. A process according to claim 18, wherein the oxidation step is carried out in the presence of from 0.05 to 10% by weight based on the 6,13-dihydroquinacridone of a particle growth inhibitor.

24. A process according to claim 23, wherein said particle growth inhibitor is imidazolylmethyl-, phthalimidomethyl- or pyrazolylmethylquinacridone, quinacridone monosulfonic acid or its salts, or a 1,4-diketo-3,6-diarylpyrrolo[3,4-c]pyrrole sulfonic acid, or salt thereof.

25. A process according to claim 1, wherein the quinacridone is unsubstituted quinacridone, 2,9-dichloroquinacridone, 4,11-difluoroquinacridone, 4,11-dichloroquinacridone, 2,9-dimethylquinacridone or 2,9-dimethoxyquinacridone.

26. A process according to claim 1, wherein the quinacridone is a quinacridone pigment solid solution.

27. A process according to claim 26, wherein the quinacridone is a quinacridone/2,9-dichloroquinacridone, quinacridone/4,11-dichloroquinacridone, quinacridone/2,9-dimethylquinacridone, quinacridone/2,9-dimethoxyquinacridone, 2,9-dichloroquinacridone/2,9-dimethylquinacridone, 2,9-dichloroquinacridone/2,9-dimethoxyquinacridone or 2,9-dimethylquinacridone/2,9-dimethoxyquinacridone pigment solid solution.

* * * * *